United States Patent Office 3,309,391
Patented Mar. 14, 1967

3,309,391
METHYL S-ALLYL- AND METHYL S-PROPARGYL-2,3,5,6 - TETRAHALOMONOTHIOTEREPHTHAL-ATE
Sidney B. Richter, Chicago, and Alfred A. Levin, Skokie, Ill., assignors to Velsicol Chemical Corporation, Chicago, Ill., a corporation of Illinois
No Drawing. Filed Oct. 13, 1964, Ser. No. 403,630
5 Claims. (Cl. 260—455)

This invention relates to new compositions matter. More particularly, this invention relates to new chemical compounds of the formula

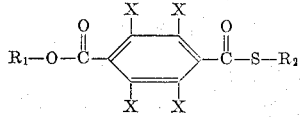

wherein $R_1$ is selected from the group consisting of methyl and ethyl; $R_2$ is selected from the group consisting of allyl and propargyl; and X is halogen. While the halogen can be fluorine, chlorine, bromine or iodine, the preferred halogen is chlorine or bromine, and the most preferred halogen is chlorine. These new compounds have been found to be useful as pesticides, particularly as herbicides.

The compounds of this invention can readily be prepared employing an appropriate dialkyl 2,3,5,6-tetrachloroterephthalate, which can be prepared in the manner described in Rabjohn, J. Am. Chem. Soc., 70, 3518 (1948), as the starting material. This starting material is subjected to hydrolysis with an equimolar amount of a suitable base such as potassium hydroxide, sodium hydroxide and the like. The hydrolysis reaction is performed in a solvent, such as dioxane, benzene or dioxane-methanol solution, at the reflux temperature of the solvents-reactants mixture. The resulting half-ester acid is recovered from the mixture by pouring the mixture into water, extracting the unreacted diester with an appropriate organic solvent such as diethyl ether and acidifying the aqueous fraction to yield the desired material which is then chlorinated with a suitable chlorinating agent such as thionyl chloride, phosphorus pentachloride, and the like to produce a half-ester half acyl chloride. Chlorination is conveniently effected without a solvent when thionyl chloride is used as the chlorinating agent or at the reflux temperature of the solvent if a solvent is necessary. The crude half-ester half acyl chloride is recovered from the reaction mixture by removing the chlorinating agent, for example by distillation in vacuo. This crude product can be purified or can be used as such to react with an appropriate mercaptan of the formula $HSR_2$, wherein $R_2$ is as described above. Each molar proportion of the half-ester half acyl chloride is treated with a molar proportion of the mercaptan either in the presence of a base or as the alkali metal salt. Ordinarily, it is preferred to use the mercaptan in the form of an aqueous solution of one of its alkali metal salts for convenience in handling. Sodium allyl mercaptan and sodium propargyl mercaptan are good reagents for this reaction.

The manner in which the new compounds of this invention can be prepared is illustrated in the following examples.

EXAMPLE 1

Preparation of 4-carbomethoxy-2,3,5,6-tetrachlorobenzoic acid

Dimethyl 2,3,5,6-tetrachloroterephthalate (65 g.; 0.2 mol) dissolved in dioxane (400 ml.) is placed into a 1 liter, three-necked flask equipped with a mechanical stirrer, reflux condenser and heating mantle. Potassium hydroxide (10.9 g.; 0.2 mol) in 130 ml. of 3:2 dioxane-methanol solution was added to the flask. The mixture was heated at reflux with stirring for six hours and then poured into one liter of cold water to precipitate the unreacted dimethyl 2,3,5,6-tetrachloroterephthalate, which upon extraction from the aqueous solution with diethyl ether and stripping of the ether yielded 33.8 g. (0.1 mol) of unreacted dimethyl 2,3,5,6-tetrachloroterephthalate. The aqueous solution was acidified with hydrochloric acid yielding an oil, which was dissolved in diethyl ether. The ethereal solution was separated from the aqueous mixture, washed with cold water, dried over magnesium sulfate, filtered free of drying agent, and stripped of diethyl ether by heating in vacuo to yield an oil, which upon trituration with pentane yielded a yellow solid. The solid was recrystallized from benzene-pentane to yield 4-carbomethoxy-2,3,5,6-tetrachlorobenzoic acid melting 167–9° C., in an 82.7% yield based on recovered starting material. The half-ester acid had the following elemental analysis:

Analysis for $C_9H_4Cl_4O_4$.—Theoretical, percent: C, 34.00; H, 1.27. Found, percent: C, 34.65; H, 1.29.

EXAMPLE 2

Preparation of 4-carbomethoxy-2,3,5,6 tetrachlorobenzoyl chloride

A mixture of 4-carbomethoxy-2,3,5,6-tetrachlorobenzoic acid (8.5 g.; 0.027 mol), prepared as described in Example 1, and thionyl chloride (50 ml.) was heated at reflux for 16 hours. The mixture was then cooled and excess thionyl chloride removed by heating under reduced pressure to yield an oil which solidified on standing. The solid was triturated with a small amount of pentane to yield crude acyl chloride melting at 82–4° C. in a 74.4% yield. The crude material had the following elemental analysis:

Analysis for $C_9H_3O_3Cl_5$.—Theoretical percent: C, 32.13; H. 0.9. Found percent: C, 33.13; H, 1.28.

EXAMPLE 3

Preparation of methyl S-allyl-2,3,5,6-tetrachloromonothioterephthalate

A solution of 4-carbomethoxy-2,3,5,6-tetrachlorobenzoyl chloride (25 g.; 0.075 mol), prepared as described in Example 2, in 100 ml. of dioxane was added with stirring to a solution (30 g.) of the sodium salt of allyl mercaptan (0.08 mol) in a 250 ml., three-necked flask fitted with a mechanical stirrer and reflux condenser. The mixture was stirred overnight at room temperature and then the dioxane layer was separated and dried over magnesium sulfate. The drying agent was filtered and the solvent stripped to yield an oil. Pentane was added to the oil to precipitate out a small amount of highly insoluble solid which was filtered off. The pentane was stripped from the filtrate and the residual oil was cooled and then distilled to yield the desired product methyl S-allyl-2,3,5,6-tetrachloromonothioterephthalate, a yellow oil, B.P. 170–2° C/0.1 mm. Hg, $n_D^{30}$ 1.5845.

Analysis for $C_{12}H_8O_3Cl_4S$.—Theoretical, percent: S, 8.57. Found, percent: S, 8.20.

EXAMPLE 4

Preparation of methyl S-propargyl-2,3,5,6-tetrachloromonothioterephthalate

A solution (30 g.) of the sodium salt of propargyl mercaptan (0.08 mol) is added with stirring to a solution of 4-carbomethoxy-2,3,5,6-tetrachlorobenzoyl chloride (25 g.; 0.075 mol), prepared as described in Example 2, in 100 ml. of dioxane in a 250 ml., three-necked flask fitted with a mechanical stirrer and reflux condenser.

The mixture is stirred overnight at room temperature and then the dioxone layer is separated and dried over magnesium sulfate. The drying agent is filtered and the solvent stirpped to yield the desired product, methyl S-propargyl-2,3,5,6-tetrachloromonothioterephthalate.

It will be readily recognized that in view of the preparation procedure detailed in the above examples, one skilled in the art could now prepare other compounds within the scope of the present invention from the appropriate starting materials. Thus, by way of illustration, in the examples below are presented the appropriate starting materials and reactants required to prepare the named compounds of the present invention.

EXAMPLE 5

Diethyl 2,3,5,6-tetrachloroterephthalate+potassium hydroxide+thionyl chloride+allyl mercaptan=ethyl S-allyl-2,3,5,6-tetrachloromonothioterephthalate.

EXAMPLE 6

Diethyl 2,3,5,6-tetrachloroterephthalate+potassium hydroxide+thionyl chloride+propargyl mercaptan=ethyl S-propargyl-2,3,5,6-tetrachloromonothioterephthalate.

EXAMPLE 7

Dimethyl 2,3,5,6-tetrabromoterephthalate+potassium hydroxide+thionyl chloride+allyl mercaptan=methyl S-allyl-2,3,5,6-tetrabromomonothioterephthalate.

EXAMPLE 8

Dimethyl 2,3,5,6-tetrabromoterephthalate+potassium hydroxide+thionyl chloride+propargyl mercaptan= methly S-propargyl-2,3,5,6-tetrabromomonothioterephthalate.

EXAMPLE 9

Dimethyl 2,3,5,6-tetrafluoroterephthalate+potassium hydroxide+thionyl chloride+allyl mercaptan=methyl S-allyl-2,3,5,6-tetrafluoromonothioterephthalate.

EXAMPLE 10

Dimethyl 2,3,5,6-tetrafluoroterephthalate+potassium hydroxide+thionyl chloride+propargyl mercaptan= methyl S-propargyl-2,3,5,6-tetrafluoromonothioterephthalate.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionnic surface-active agents.

A typical herbicidal composition according to this invention is illustrated by the following example, in which the quantities are in parts by weight.

EXAMPLE 11

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambs-quarters, yellow foxtail, crabgrass, wild mustard, French-weed, rye grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, soil samples seeded with various weeds sprayed within 24 hours after seeding with aqueous emulsions of the test compounds. After the sprays were applied to the soil, the containers were maintained under greenhouse conditions for 15–20 days. The plants were then observed for injury, and the degree inqury was rated as follows: 0=no injury; 1, 2=slight injury; 3, 4=moderate injury; 5, 6=moderately severe injury; 7, 8, 9=severe injury; 10=death. In these experiments, methyl S-allyl-2,3,5,6-tetrachloromonothioterephthalate, when applied to soil at a rate equivalent to 8 lbs./acre, caused injury rated at 9 to crabgrass and foxtail, and injury rated at 8 to barnyard grass. Furthermore, this compound exhibited safety to crop plants such as corn, cotton, rice, soybeans and wheat; at dosages equivalent to 8 lbs./acre the methyl S-allyl-2,3,5,6-tetrachloromonothioterephthalate cause no injury to these crops.

We claim:
1. Compounds of the general formula:

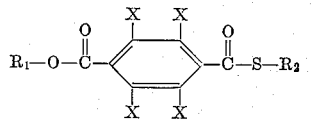

wherein $R_1$ is selected from the group consisting of methyl and ethyl; $R_2$ is selected from the group consisting of allyl and propargyl; and X is halogen.

2. Methyl S-allyl-2,3,5,6-tetrachloromonothioterephthalate.
3. Methyl S-propargyl-2,3,5,6-tetrachloromonothioterephthalate.
4. Methyl S-allyl-2,3,5,6-tetrabromomonothioterephthalate.
5. Methyl S-propargyl-2,3,5,6-tetrabromomonothioterephthalate.

References Cited by the Examiner

UNITED STATES PATENTS

| | | | |
|---|---|---|---|
| 2,396,487 | 3/1946 | Blake | 260—455 |
| 2,396,513 | 3/1946 | Jones | 71—2.6 |
| 2,826,600 | 3/1958 | Driver | 260—455 |
| 2,893,855 | 7/1959 | Smith | 71—2.6 |
| 2,979,538 | 4/1961 | Wotiz | 260—455 |

FOREIGN PATENTS 746,051   3/1956   Great Britain.

CHARLES B. PARKER, *Primary Examiner.*

JAMES O. THOMAS, JR., *Examiner.*

A. J. ADAMCIK, D. R. PHILLIPS, *Assistant Examiners.*